United States Patent
Min et al.

(10) Patent No.: US 9,832,389 B2
(45) Date of Patent: Nov. 28, 2017

(54) APPARATUS FOR GENERATING IMAGE AND METHOD THEREOF

(71) Applicant: SK hynix Inc., Gyeonggi-do (KR)

(72) Inventors: Chang-Ki Min, Gyeonggi-do (KR); Nam-Hyun Kim, Gyeonggi-do (KR); Se-Myoung Jung, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 15 days.

(21) Appl. No.: 14/886,932

(22) Filed: Oct. 19, 2015

(65) Prior Publication Data

US 2016/0352995 A1    Dec. 1, 2016

(30) Foreign Application Priority Data

May 26, 2015    (KR) .................. 10-2015-0072841

(51) Int. Cl.
  *H04N 5/228*    (2006.01)
  *H04N 5/235*    (2006.01)
  (Continued)

(52) U.S. Cl.
  CPC ........... *H04N 5/2355* (2013.01); *G06T 5/008* (2013.01); *G06T 5/50* (2013.01); *H04N 5/23254* (2013.01);
  (Continued)

(58) Field of Classification Search
  CPC ............ H04N 5/23229; H04N 5/2355; H04N 5/2356; G06T 5/50
  (Continued)

(56) References Cited

U.S. PATENT DOCUMENTS

2012/0201456 A1*  8/2012  El-Mandy .............. G06T 5/009
                                                382/167
2012/0257824 A1* 10/2012  Jang ....................... G06T 5/009
                                                382/166
(Continued)

FOREIGN PATENT DOCUMENTS

KR    1020050009694    1/2005
KR    1020130049825    5/2013

OTHER PUBLICATIONS

Duan, J., et al., Comprehensive Fast Tone Mapping for High Dynamic Range Image Visualization, Pacific Graphics, 2005.
(Continued)

*Primary Examiner* — Kelly L Jerabek
(74) *Attorney, Agent, or Firm* — IP & T Group LLP

(57) ABSTRACT

An apparatus includes an image conversion unit suitable for converting a short exposure block according to an exposure ratio; a motion and saturation detection unit suitable for receiving a long exposure block and an L short exposure block converted by the image conversion unit, and detecting motion and saturation; a radiance map generation unit suitable for fusing the long and L short exposure blocks using a guided filter, and generating a radiance map; a luminance acquirement unit suitable for acquiring luminance of the radiance map, and generating luminance using the L short exposure block or respectively generating luminance using the long and L short exposure blocks; and a dynamic range compression unit suitable for performing global tone mapping using the luminance acquired by the luminance acquirement unit, and compressing a dynamic range.

6 Claims, 6 Drawing Sheets

(51) Int. Cl.
  *G06T 5/00*    (2006.01)
  *G06T 5/50*    (2006.01)
  *H04N 5/232*   (2006.01)

(52) U.S. Cl.
  CPC .............. *G06T 2207/10016* (2013.01); *G06T 2207/10144* (2013.01); *G06T 2207/20021* (2013.01); *G06T 2207/20221* (2013.01)

(58) Field of Classification Search
  USPC ................. 348/218.1, 222.1, 223.1, 239
  See application file for complete search history.

(56) References Cited

U.S. PATENT DOCUMENTS

| | | | | |
|---|---|---|---|---|
| 2013/0070965 | A1* | 3/2013 | Jang | G06K 9/60 |
| | | | | 382/103 |
| 2014/0152686 | A1* | 6/2014 | Narasimha | G09G 5/377 |
| | | | | 345/589 |
| 2016/0093029 | A1* | 3/2016 | Micovic | H04N 5/2355 |
| | | | | 348/229.1 |
| 2016/0105656 | A1* | 4/2016 | Lin | H04N 9/735 |
| | | | | 348/223.1 |

OTHER PUBLICATIONS

He, K., et al., Guided Image Filtering, IEEE Transactions on Pattern Analysis and Machine Intelligence, 2013, pp. 1397-1409, vol. 35, No. 6.

* cited by examiner

APPARATUS FOR GENERATING IMAGE AND METHOD THEREOF

CROSS-REFERENCE TO RELATED APPLICATIONS

The present application claims priority of Korean Patent Application No. 10-2015-0072841, filed on May 26, 2015, which is incorporated herein by reference in its entirety.

BACKGROUND

1. Field

Exemplary embodiments of the present invention relate to a Complementary Metal Oxide Semiconductor (CMOS) image sensor (CIS), and more particularly, to an apparatus for generating a high dynamic range image and a method thereof.

2. Description of the Related Art

Dynamic range is one of the important criteria for judging the quality of an image sensor. Dynamic range is the maximum range in which an input signal may be processed without distortion. With wide dynamic range, it is possible to acquire a quality image even with great variance in brightness. Conventional color image sensors are known to have narrow dynamic ranges. And, when one or more of the red, green, and blue colors are in a saturated state, the image sensor is unable to accurately capture the image.

In order to overcome the disadvantage of having a narrow dynamic range, synthesis of images having different exposure tunes has been attempted.

Since conventional high dynamic range (HDR) algorithms simply use a weighted sum scheme, noise may occur when synthesizing images.

Furthermore, since the conventional high dynamic range algorithms use local tone mapping to preserve local tone, which is highly complex, it is difficult to implement with hardware.

In addition, the conventional high dynamic range algorithm uses a lot of memory to incorporate luminance at the time of tone mapping.

As a consequence, since conventional high dynamic range (HDR) algorithms are highly complex, noise occurs at the time of synthesis and a lot of memory and other resources are consumed.

SUMMARY

Various embodiments are directed to an image generation apparatus capable of maintaining the same performance with lower complexity than that of conventional high dynamic range (HDR) algorithms, and a method thereof.

In an embodiment, an apparatus for generating an image may include: an image conversion unit suitable for converting a short exposure block according to an exposure ratio; a motion and saturation detection unit suitable for receiving a long exposure block and an L short exposure block converted by the image conversion unit and detecting motion and saturation; a radiance map generation unit suitable for fusing the long and L short exposure blocks using a guided filter, and generating a radiance map; a luminance acquirement unit suitable for acquiring luminance of the radiance map, and generating luminance using the L short exposure block or respectively generates luminance using the long and L short exposure blocks; and a dynamic range compression unit suitable for performing global tone mapping using the luminance acquired by the luminance acquirement unit, and compressing a dynamic range.

The image conversion unit may include a multiplier suitable for multiplying the short exposure block with the exposure ratio, and converting the short exposure block to the L short exposure block.

The motion and saturation detection unit may calculate an average value regardless of a color, and detect the saturation.

The radiance map generation unit may generate a 3×3 block according to a color of a center pixel of an input block in order to use a Bayer image as an input of the guided filter.

The guided filter may be implemented as expressed by equation A below, $f_{mean}$ of equation A may be changed as expressed by equation B below, and q of equation A may be changed as expressed by equation C below.

[Equation A]

1: $\text{Mean}_I = f_{mean}(I)$ $\text{Mean}_p = f_{mean}(p)$ $\text{Corr}_I = f_{mean}(I.*I)$ $\text{Corr}_{Ip} = f_{mean}(I.*p)$ 2: $\text{Var}_I = \text{Corr}_I - \text{Mean}_I.*\text{Mean}_I$ $\text{Cov}_{Ip} = \text{Corr}_{Ip} - \text{Mean}_I.*\text{Mean}_p$ 3: $a = \text{Cov}_{Ip}./(\text{Var}_I + \lambda)$ $b = \text{Mean}_p - a.*\text{Mean}_I$ 4: $\text{Mean}_a = f_{mean}(a)$ $\text{Mean}_b = f_{mean}(b)$ 5: $q = \text{Mean}_a.*I + \text{Mean}_b$

[Equation B]

$\text{Out}[0] = (x[0]*3 + x[1]*3 + x[2]*2 + x[3]*3 + x[4]*3 + x[6]*2) >> 4$ $\text{Out}[1] = (x[0]*3 + x[1]*3 + x[2]*3 + x[3]*2 + x[4]*3 + x[5]*2) >> 4$ $\text{Out}[2] = (x[1]*3 + x[2]*3 + x[0]*2 + x[4]*3 + x[5]*3 + x[8]*2) >> 4$ $\text{Out}[3] = (x[0]*3 + x[1]*2 + x[3]*3 + x[4]*3 + x[6]*3 + x[7]*2) >> 4$ $\text{Out}[4] = (x[0] + x[1] + x[2] + x[3] + x[5] + x[6] + x[7] + x[8]) >> 3$ $\text{Out}[5] = (x[1]*2 + x[2]*3 + x[4]*3 + x[5]*3 + x[7]*2 + x[8]*3) >> 4$ $\text{Out}[6] = (x[3]*3 + x[4]*3 + x[6]*3 + x[7]*3 + x[0]*2 + x[8]*2) >> 4$ $\text{Out}[7] = (x[3]*2 + x[4]*3 + x[5]*2 + x[6]*3 + x[7]*3 + x[8]*3) >> 4$ $\text{Out}[8] = (x[4]*3 + x[5]*3 + x[7]*3 + x[8]*3 + x[2]*2 + x[6]*2) >> 4$

[Equation C]

$q = \text{Mean}_a \times I_{center} + \text{Mean}_b$ wherein, p and I indicate an input image and a guidance image, $f_{mean}$ indicates a mean filter having a windows radius of r, λ is a parameter for adjusting strength of the guided filter, and all operations except for $f_{mean}$ indicate matrix operations.

When a motion and saturation area is detected by the motion and saturation detection unit, the radiance map generation unit may replace the long exposure block with the L short exposure block and perform noise filtering for an L short exposure image, and when the motion and saturation area is not detected by the motion and saturation detection unit, the radiance map generation unit may perform a weighted sum for the long exposure block and a result of the guided filter, and eliminate noise.

When a motion and saturation area is detected by the motion and saturation detection unit, the luminance acquirement unit may generate L short luminance using the L short exposure block similarly to the luminance of the radiance map, and when the motion and saturation area is not detected by the motion and saturation detection unit, the luminance acquirement unit may respectively generate long luminance and L short luminance using the long exposure block and the L short exposure block similarly to the luminance of the radiance map, and perform a weighted sum.

The dynamic range compression unit may use local weight in global tone mapping.

In another embodiment, a method for generating an image may include: converting a short exposure block according to an exposure ratio; receiving a long exposure block and an L short exposure block converted by the converting of the short exposure block, and detecting motion and saturation; fusing the long and L short exposure blocks using a guided filter, and generating a radiance map; acquiring luminance of the generated radiance map, and generating luminance using the L short exposure block or respectively generating luminance using the long and L short exposure blocks; and performing global tone mapping using the acquired luminance, and compressing a dynamic range.

The fusing of the long and L short exposure blocks may generate a 3×3 block according to a color of a center pixel of an input block in order to use a Bayer image as an input of the guided filter.

The guided filter may be implemented as expressed by equation A below, $f_{mean}$ of equation A is changed as expressed by equation B below, and q of equation A is changed as expressed by equation C below,

[Equation A]

1: $Mean_I = f_{mean}(I)$ $Mean_p = f_{mean}(p)$ $Corr_I = f_{mean}(I.*I)$ $Corr_{Ip} = f_{mean}(I.*p)$ 2: $Var_I = Corr_I - Mean_I.*Mean_I$ $Cov_{Ip} = Corr_{Ip} - Mean_I.*Mean_p$ 3: $a = Cov_{Ip}./(Var_I + \lambda)$ $b = Mean_p - a.*Mean_I$ 4: $Mean_a = f_{mean}(a)$ $Mean_b = f_{mean}(b)$ 5: $q = Mean_a.*I + Mean_b$

[Equation B]

$Out[0] = (x[0]*3+x[1]*3+x[2]*2+x[3]*3+x[4]*3+x[6]*2) >> 4$ $Out[1] = (x[0]*3+x[1]*3+x[2]*3+x[3]*2+x[4]*3+x[5]*2) >> 4$ $Out[2] = (x[1]*3+x[2]*3+x[0]*2+x[4]*3+x[5]*3+x[8]*2) >> 4$ $Out[3] = (x[0]*3+x[1]*2+x[3]*3+x[4]*3+x[6]*3+x[7]*2) >> 4$ $Out[4] = (x[0]+x[1]+x[2]+x[3]+x[5]+x[6]+x[7]+x[8]) >> 3$ $Out[5] = (x[1]*2+x[2]*3+x[4]*3+x[5]*3+x[7]*2+x[8]*3) >> 4$ $Out[6] = (x[3]*3+x[4]*3+x[6]*3+x[7]*3+x[0]*2+x[8]*2) >> 4$ $Out[7] = (x[3]*2+x[4]*3+x[5]*2+x[6]*3+x[7]*3+x[8]*3) >> 4$ $Out[8] = (x[4]*3+x[5]*3+x[7]*3+x[8]*3+x[2]*2+x[6]*2) >> 4$

[Equation C]

$q = Mean_a \times I_{center} + Mean_b$, wherein, p and I indicate an input image and a guidance image, $f_{mean}$ indicates a mean filter having a windows radius of r, λ is a parameter for adjusting strength of the guided filter, and all operations except for $f_{mean}$ indicate matrix operations.

When the detecting of the motion and saturation detects a motion and saturation area, the fusing of the long and L short exposure blocks may replace the long exposure block with the L short exposure block, and perform noise filtering for an L short exposure image, and when the detecting of the motion and saturation does not detect the motion and saturation area, the fusing of the long and L short exposure blocks may perform a weighted sum for the long exposure block and a result of the guided filter, and eliminate noise.

When the detecting of the motion and saturation detects a motion and saturation area, the acquiring of the luminance may generate L short luminance using the L short exposure block similarly to the luminance of the radiance map, and when the detecting of the motion and saturation does not detect the motion and saturation area, the acquiring of the luminance may respectively generate long luminance and L short luminance using the long exposure block and the L short exposure block similarly to the luminance of the radiance map and a weighted sum is performed.

The performing of the global tone mapping may use local weight.

In accordance with an embodiment of the present invention, different from a conventional high dynamic range (HDR) algorithm, images are synthesized using a fusion scheme based on a guided filter, so that it is possible to reduce noise.

Furthermore, in accordance with an embodiment of the present invention, tone mapping is adoptively performed for a scene, so that it is possible to effectively generate a high dynamic range image.

Furthermore, in accordance with an embodiment of the present invention, since locality is considered using local weight in global tone mapping having lower complexity than the local tone mapping, it is easily implemented with hardware.

That is, in the present invention, since smaller resources are used than those of the conventional high dynamic range algorithm, it is easily implemented with hardware and it is possible to reduce the size of the hardware. Furthermore, since the present invention uses local weight in the global tone mapping having lower complexity than the local tone mapping, complexity is reduced and the Halo effect does not occur.

Furthermore, since the present invention uses luminance of input, it is possible to significantly reduce the memory resources consumed.

DETAILED DESCRIPTION

Figure 1:
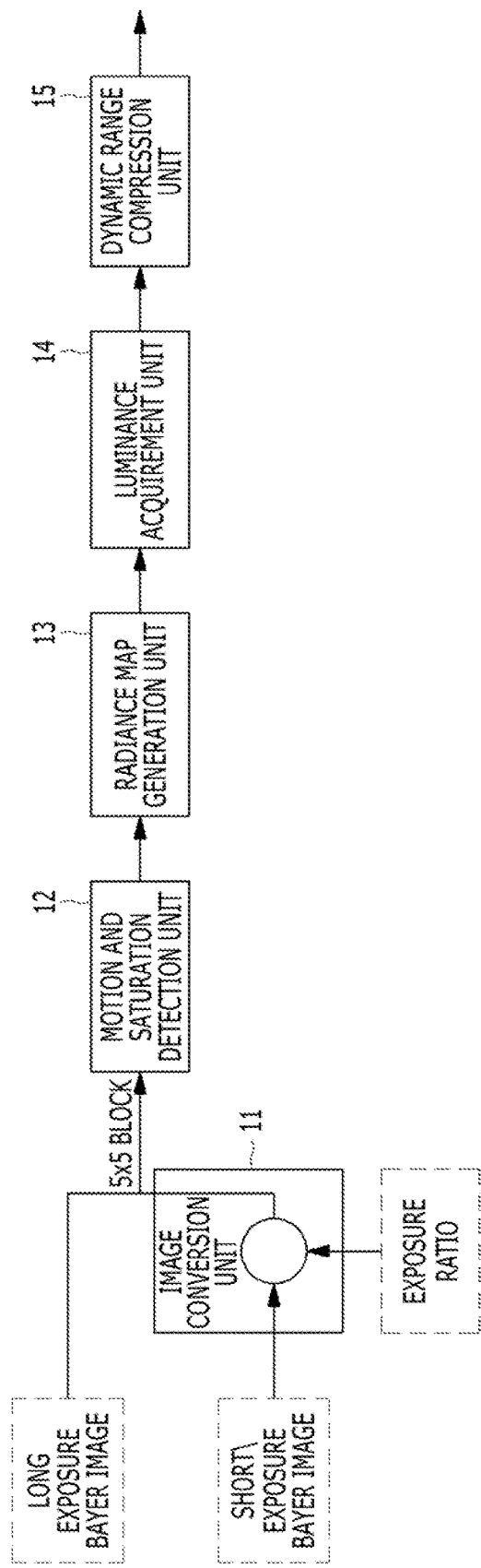
FIG. 1 is a block diagram illustrating a low complexity high dynamic range image generation apparatus in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a low complexity high dynamic range image generation apparatus in accordance with an embodiment of the present invention.

As illustrated in FIG. 1, the low complexity high dynamic range image generation apparatus includes an image conversion unit 11 for converting a short exposure block according to an exposure ratio, a motion and saturation detection unit 12 for receiving a long exposure block and an L short exposure block converted by the image conversion unit 11 and detecting motion and saturation, a radiance map generation unit 13 for fusing the long and L short exposure blocks from the motion and saturation detection unit 12 using a guided filter and generating a radiance map, a luminance acquirement unit 14 for acquiring luminance of the radiance map generated by the radiance map generation unit 13 and generating luminance using the L short exposure block or respectively generating luminance using the long and L short exposure blocks, and a dynamic range compression unit 15 for performing global tone mapping using the luminance acquired by the luminance acquirement unit 14 and compressing a dynamic range.

In general, the structure of a low complexity high dynamic range (LC HDR) image generation apparatus is highly different from conventional high dynamic range algorithms in that it uses the guided filter in order to generate the radiance map.

The LC HDR image generation apparatus receives long and short exposure Bayer 5×5 blocks from an external analog-to-digital converter (ADC, not illustrated). The long exposure block ("long exposure Bayer image" in FIG. 1) is used as a long exposure block in the motion and saturation detection unit 12. The short exposure block ("short exposure Bayer image" in FIG. 1) is multiplied with an exposure ratio, which is provided from an external control unit (not illustrated), and is converted to an L short exposure block by the image conversion unit 11. The image conversion unit 11, for example, may be implemented with a multiplier. The inputted long and short exposure Bayer blocks may have different sizes than 5×5, and the number of inputted images may vary.

The motion and saturation detection unit 12 uses block matching of the conventional high dynamic range (HDR) algorithm for the motion detection.

As expressed in equation 1 below, the motion and saturation detection unit 12 uses the 5×5 block, calculates a Sum of Absolute Difference (SAD) of the long exposure block and the L short exposure block, and detects a motion when the Block_dif is larger than a preset first threshold value $TH_1$.

$$\text{Block\_Dif} = \frac{\sum_y \sum_x \text{abs}(Long_{x,y} - LShort_{x,y})}{25} \quad \text{[Equation 1]}$$

if Block_Dif > $TH_1$ then Motion_Flag = 1

The motion and saturation detection unit 12 performs the saturation detection as expressed by equation 2 below. The motion and saturation detection unit 12 separately processes the long exposure block and the L short exposure block and detects saturation when Block_aver is larger than a preset second threshold value $TH_2$. In this case, the motion and saturation detection unit 12 receives the long exposure block and the L short exposure bock converted by the image conversion unit 11, calculates an average value regardless of colors, and detects the saturation.

$$\text{Block\_Aver} = \frac{\sum_{y=1}^{3} \sum_{x=1}^{3} Block_{x,y}}{9} \quad \text{[Equation 2]}$$

if Block_Aver > $TH_2$ then Sat_Flag = 1

Finally, as expressed by equation 3 below, when any one of the three flags Motion_Flag, Sat_Flag$_L$, or Sat_Flag$_{LS}$ has been set, it is determined as a motion and saturation area (MS_Flag=1).

Equation 3

If Motion_Flag or Sat_Flag$_L$ or Sat_Flag$_{LS}$ then
    MS_Flag=1

Figure 2:
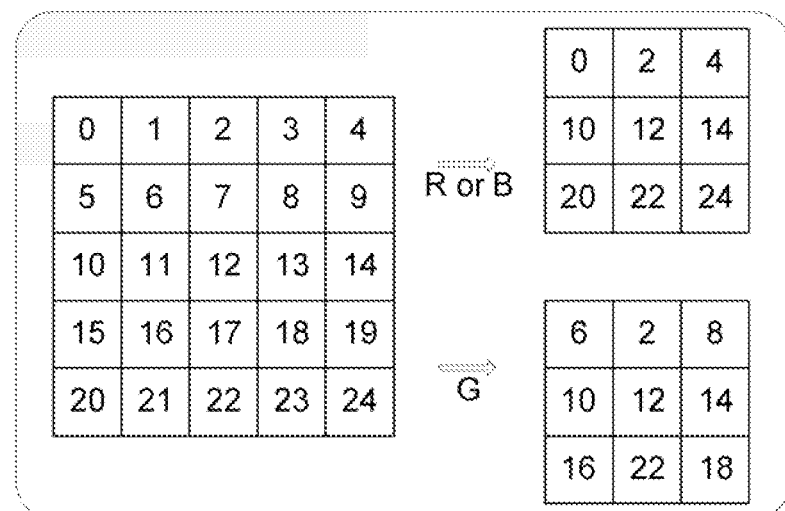
FIG. 2 is a conceptual diagram illustrating generation of different 3×3 blocks according to a color of a center pixel of a block.

The radiance map generation unit 13 generates a 3×3 block from the 5×5 block, fuses the long exposure block with the L short exposure block using the guided filter, and generates the radiance map. FIG. 2 is a conceptual diagram illustrating generation of different 3×3 blocks according to a color of a center pixel of a block. As illustrated in FIG. 2, different 3×3 blocks are generated according to the color of the center pixel of the 5×5 input block in order to use the Bayer image as an input of the guided filter.

The guided filter has noise elimination performance similar to that of the bilateral filter, is advantageous in that it is easily implemented because exponential operation is not required, and has superior structure-transferring filtering characteristics capable of allowing a target image to have a structure of a guidance image. By using such characteristics, the radiance map generation unit 13 uses the long exposure image as the guidance image, uses the short exposure image as the target image, and fuses them. The reason the short exposure image is used as the target image is because the short exposure image has a dynamic range wider than that of the long exposure image and has low motion blur. The guided filter may be expressed by equation 4 below.

[Equation 4]

$$1: \text{Mean}_I = f_{mean}(I)$$

$$\text{Mean}_p = f_{mean}(p)$$

$$\text{Corr}_I = f_{mean}(I.*I)$$

$$\text{Corr}_{Ip} = f_{mean}(I.*p)$$

$$2: \text{Var}_I = \text{Corr}_I - \text{Mean}_I.*\text{Mean}_I$$

$$\text{Cov}_{Ip} = \text{Corr}_{Ip} - \text{Mean}_I.*\text{Mean}_p$$

$$3: a = \text{Cov}_{Ip}./(\text{Var}_I + \lambda)$$

$$b = \text{Mean}_p - a.*\text{Mean}_I$$

$$4: \text{Mean}_a = f_{mean}(a)$$

$$\text{Mean}_b = f_{mean}(b)$$

$$5: q = \text{Mean}_a.*I + \text{Mean}_b$$

In equation 4 above, p and I indicate the input image and the guidance image, and $f_{mean}$ indicates a mean filter having a windows radius of r. Furthermore, $\lambda$ is a parameter for adjusting strength of the guided filter, but is not used in the low complexity high dynamic range image generation apparatus. In addition, all operations except for $f_{mean}$ indicate matrix operations.

The guided filter operates as the following example. When the size of $f_{mean}$ is 3×3, $\text{Mean}_x$ should be a 3×3 matrix. Accordingly, $f_{mean}$ should be performed in a patch of minimum 5×5 or more. In short, for the operation of the guided filter having a diameter (r*2) of 3, five or more line memories are required. This represents that 9 or more line memories are required in a Bayer domain which is a target of the low complexity high dynamic range image generation apparatus. This deviates from the purpose of the low complexity high dynamic range image generation apparatus.

In order to solve such a problem, in the LC HDR image generation apparatus, $f_{mean}$ is changed as expressed by the following equation 5 implementing a structure in which a small number of line memories may be used while maintaining maximum performance.

[Equation 5]

$$\text{Out}[0] = (x[0]*3 + x[1]*3 + x[2]*2 + x[3]*3 + x[4]*3 + x[6]*2) >> 4$$

$$\text{Out}[1] = (x[0]*3 + x[1]*3 + x[2]*3 + x[3]*2 + x[4]*3 + x[5]*2) >> 4$$

$$\text{Out}[2] = (x[1]*3 + x[2]*3 + x[0]*2 + x[4]*3 + x[5]*3 + x[8]*2) >> 4$$

$$\text{Out}[3] = (x[0]*3 + x[1]*2 + x[3]*3 + x[4]*3 + x[6]*3 + x[7]*2) >> 4$$

$$\text{Out}[4] = (x[0] + x[1] + x[2] + x[3] + x[5] + x[6] + x[7] + x[8]) >> 3$$

$$\text{Out}[5] = (x[1]*2 + x[2]*3 + x[4]*3 + x[5]*3 + x[7]*2 + x[8]*3) >> 4$$

$$\text{Out}[6] = (x[3]*3 + x[4]*3 + x[6]*3 + x[7]*3 + x[0]*2 + x[8]*2) >> 4$$

$$\text{Out}[7] = (x[3]*2 + x[4]*3 + x[5]*2 + x[6]*3 + x[7]*3 + x[8]*3) >> 4$$

$$\text{Out}[8] = (x[4]*3 + x[5]*3 + x[7]*3 + x[8]*3 + x[2]*2 + x[6]*2) >> 4$$

Figure 3:
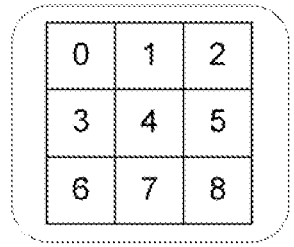
FIG. 3 is a pixel diagram illustrating indexes of a 3×3 block.

In Equation 5 above, Out[index] and x[index] follow indexes of a 3×3 block as illustrated in FIG. 3.

$f_{mean}$ of the fourth term of equation 4 above calculates a mean of "a" and "b". That is, $\text{Mean}_a$ and $\text{Mean}_b$ have single values other than a matrix. The fifth term of equation 4 above is changed as expressed by equation 6 below.

[Equation 6]

$$q = \text{Mean}_a \times I_{center} + \text{Mean}_b$$

The short exposure image, to which the guided filtering is performed, is fused with the long exposure image. During the fusion of the long and short exposure images, the characteristics of saturation and motion burr of the long exposure image are also applied to the short exposure image. In order to prevent this, when MS_Flag calculated in advance by the motion and saturation detection unit 12 is 1, the long exposure block is replaced with the L short exposure block and noise filtering is performed only to the L short image. Through such a process, the generation of the radiance map is completed, but it is not possible to sufficiently eliminate noise of the short exposure image due to the small filter of the size 3×3. In order to compensate for this, when MS_Flag is 0, a weighted sum is performed to the long exposure image and a result of the guided filter as expressed by equation 7 below, so that noise is further eliminated.

[Equation 7]

$$w_1 = \text{Max}(abs(I_{center} - q)/TH_3, 1)$$

$$w_2 = 1 - w_1$$

$$\text{Radi\_Map} = (I_{center} \times w_2) + (q \times w_1)$$

Since the generated radiance map has a wide dynamic range it requires dynamic range compression. That is, tone mapping should be performed. The tone mapping is performed using only a luminance component of the radiance map. In order to calculate luminance in the Bayer domain, color interpolation is required and in order to perform the color interpolation, a line memory for the radiance map is additionally required.

In order to solve this problem, the luminance acquirement unit 14 partly uses the luminance of the radiance map, and partly generates luminance maximally similar to the luminance of the radiance map using the L short exposure block (when MS_Flag is 1), or respectively generates luminance maximally similar to the luminance of the radiance map using the long exposure block and the L short exposure block (when MS_Flag is 0). Equation 8 below indicates conversion of the long or short exposure block to luminance. For the luminance conversion, any one of various cases of Equation 8 below may be used. For example, in case GB shown in equation 8 below, the luminance acquirement unit 14 partly uses the luminance of the radiance map as with G=Radi_Map, and partly generates luminance similar to the luminance of the radiance map as with R and B.

[Equation 8]

Case GB:

$R=(x[5]+x[7]*6+x[9]+x[5]+x[17]*6+x[19])>>4$

G=Radi_Map $B=(x[24]+x[3]+x[11]*6+x[13]*6+x[21]+x[23])>>4$

Case GR:

$R=(x[1]+x[3]+x[11]*6+x[13]*6+x[21]+x[23])>>4$

G=Radi_Map $B=(x[5]+[7]*6+x[9]+x[15]+x[17]*6+x[19])>>4$

Case B:

$R=(x[6]+x[8]+x[16]+x[18])>>2$ $G=(x[7]+x[11]+x[13]+x[17])>>2$

B=Radi_Map

Case R:

R=Radi_Map $G=(x[7]+x[11]+x[13]+x[17])>>2$ $B=(x[6]+x[16]+x[8]+x[18])>>2$ $Lumi=(B+(G\times40)+(R\times20))/61$ In Equation 8 above, x[index] conforms to the rule of the 5×5 block of the left side of FIG. 2. The luminance acquirement unit 14 calculates long luminance and L short luminance using equation 8 above, and performs a weighted sum to the long luminance and the L short luminance using the weight of the radiance map of equation 7 above again as expressed by Equation 9 below.

[Equation 9]

$Fusion\_Lumi=(Long\_Lumi \times w_2)+(LShort\_Lumi \times w_1)$

Similarly to the aforementioned radiance map, Equation 9 above is performed only when MS_Flag is 0 and only the L short luminance is calculated when MS_Flag is 1.

Basically, the tone mapping is largely classified into two types of global tone mapping and local tone mapping. The global tone mapping has low complexity, but may damage local contrast of an image. The local tone mapping has high complexity, but does not seriously damage the local contrast of the image. However, since the local tone mapping causes a Halo effect, a lot of research has been put into removing the Halo effect. In tone mapping of the conventional high dynamic range algorithm, global tone mapping is used, but to maintain local contrast, only a low frequency component of the image is compressed. However, in such case, distortion such as a Halo effect occurs, and noise is also boosted as well as a high frequency component of the image. Furthermore, an additional line memory is required.

Accordingly, the dynamic range compression unit 15 uses the global tone mapping and an adoptive tone mapping curve in consideration of the local contrast. In this case, a kernel of a basic adoptive tone mapping curve is expressed by equations 10 and 11 below.

$$TML = (D_{max} - D_{min}) \times \frac{\log(I+\tau) - \log(I_{min}+\tau)}{\log(I_{max}+\tau) - \log(I_{min}+\tau)} + D_{min}$$ [Equation 10]

$$\tau = \alpha(I_{max} - I_{min})$$ [Equation 11]

In equations 10 and 11 above, $D_{max}$ and $D_{min}$ respectively indicate maximum and minimum of output, and I indicates the luminance. Furthermore, $I_{max}$ and $I_{min}$ respectively indicate maximum and minimum of the luminance of the radiance map. in order to calculate $I_{max}$ and $I_{min}$, a histogram of a high dynamic range resultant image, which is previously acquired, is used. TML indicates tone mapping luminance. $\alpha$ is a compressive strength parameter. As $\alpha$ approaches 1, compressive strength weakens, and as $\alpha$ approaches 0, compressive strength strengthens.

The dynamic range compression unit 15 defines $\alpha$ as expressed by equation 12 below and calculates $\tau$ such that the compressive strength may be adoptively applied according to brightness characteristics of an input image.

$$C_H = \frac{I_{max} + I_{min}}{2} + \frac{Hist_H - (I_{max} + I_{min})/2}{2}$$ [Equation 12]

$$C_{HH} = \frac{C_H + I_{min}}{2} + \frac{Hist_{HH} - (C_H + I_{min})/4}{2}$$

$$\alpha_{Global} = \frac{C_{HH}}{P \times I_{max}} \times (I_{max} + I_{min})$$

In equation 12 above, $Hist_H$ indicates a luminance value corresponding to a half of a histogram accumulation value ((Width*Height)/2), and $Hist_{HH}$ indicates a luminance value corresponding to a quarter of the histogram accumulation value ((Width*Height)/4). P indicates a compressive strength parameter, and as this value is large, the entire brightness is increased. However, since $\tau$ calculated using $\alpha_{Global}$ is a global parameter, local contrast may be reduced. In order to compensate for this, locality is applied in consideration of the local contrast as expressed by equation 13 below.

$$W_g = \frac{I_{max} - I}{I_{max}}$$ [Equation 13]

$$W_l = 1 - W_g$$

$$\tau_{Bright} = (\tau_{Global} \times W_g) + (I \times W_l)$$

In equation 13 above, $\tau_{Global}$ is calculated using $\alpha_{Global}$. The calculated $\tau_{Bright}$ is put into equation 10 above to calculate $TML_{Bright}$. However, in $TML_{Bright}$, since a dim color is also determined as a dark area and noise is boosted, it is probable that image quality will be degraded. In order to prevent the degradation of the image quality, $TML_{Dark}$ is used. Equation 14 below indicates $\tau_{Dark}$ used in calculating $TML_{Dark}$.

[Equation 14]

$$\tau_{Dark} = (I_{max} - I_{min})$$

Calculation of final tone mapping luminance TML using $TML_{Dark}$ and $TML_{Bright}$ is finally expressed by equation 15 below.

[Equation 15]

$$TML=(TML_{Bright} \times W_g) \pm (TML_{Dark} \times W_l)$$

The generated tone mapping luminance TML is applied to the radiance map as expressed by equation 16 below, and is outputted as a resultant image (see FIG. 4c) of the LC HDR.

[Equation 16]

$$HDR=(Radi\_Map/Lumi) \times TML$$

As described above, since the dynamic range compression unit 15 reflects locality in the global tone mapping using the local weight, it is advantageous in that it is easily implemented with hardware.

Figure 4A:
FIG. 4a to FIG. 4c are input images and resultant images.
Figure 4B:
Figure 4C:
Figure 5A:
FIG. 5a to FIG. 5c are zoomed input images and resultant images shown in FIG. 4a to FIG. 4c.
Figure 5B:
Figure 5C:
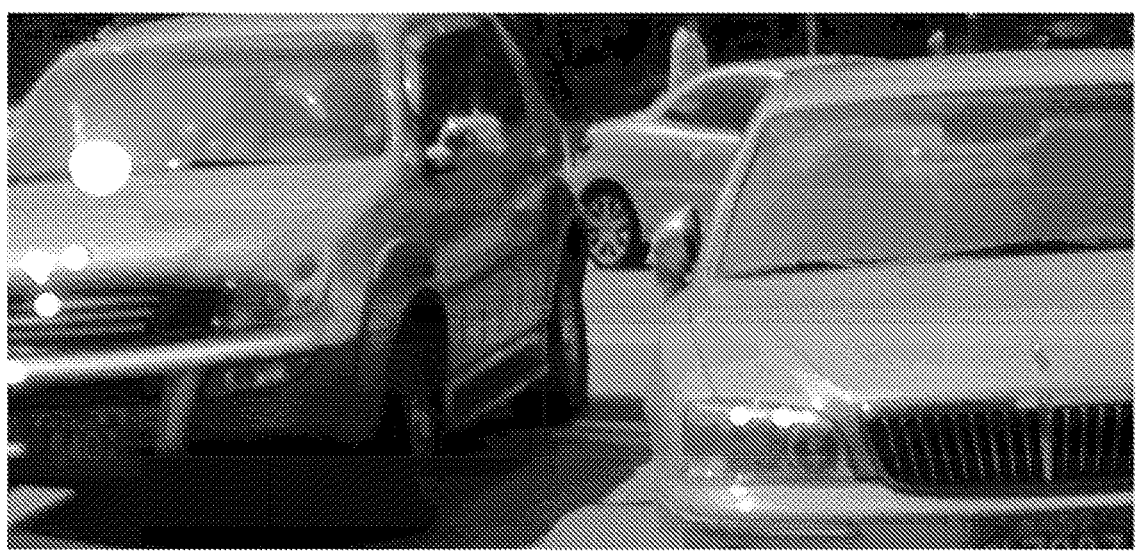

FIG. 4a to FIG. 4c are input images and resultant images, FIG. 4a illustrates the inputted long exposure Bayer image, FIG. 4b illustrates the inputted short exposure Bayer image, and FIG. 4c illustrates the resultant image of the low complexity high dynamic range. FIG. 5a to FIG. 5c are zoomed input images and resultant images shown in FIG. 4a to FIG. 4c.

The low complexity high dynamic range image generation apparatus described with reference to FIGS. 1 to 5c may be provided at positions of an interior, a front end and the like of an image signal processor (ISP).

Figure 6:
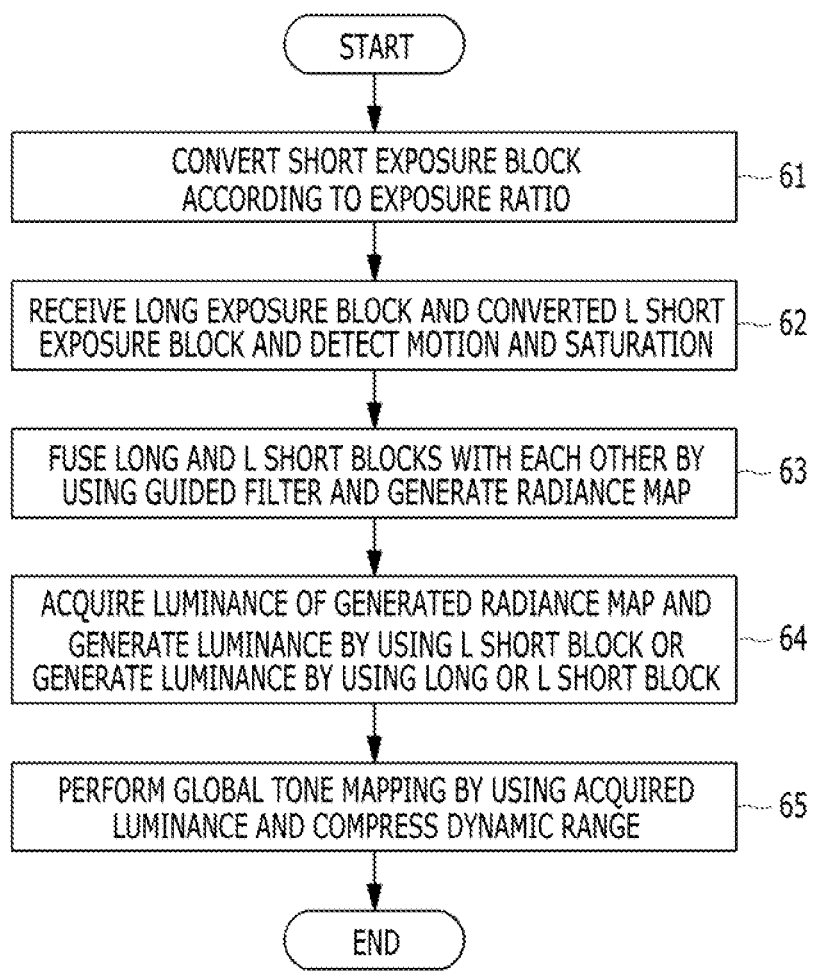
FIG. 6 is a flowchart illustrating a low complexity high dynamic range image generation method in accordance with an embodiment of the present invention.

FIG. 6 is a flowchart illustrating a low complexity high dynamic range image generation method in accordance with an embodiment of the present invention. Since a detailed embodiment thereof has been described in the description of the low complexity high dynamic range image generation apparatus of FIG. 1, the operation process thereof will be simply described below.

The image conversion unit 11 converts the short exposure block according to an exposure ratio (61).

The motion and saturation detection unit 12 receives the long exposure block and the L short exposure block converted by the image conversion unit 11, and detects motion and saturation (62).

The radiance map generation unit 13 fuses the long and L short exposure blocks from the motion and saturation detection unit 12 using the guided filter and generates the radiance map (63).

The luminance acquirement unit 14 acquires the luminance of the radiance map generated by the radiance map generation unit 13, and generates luminance using the L short exposure block or respectively generates luminance using the long and L short exposure blocks (64).

The dynamic range compression unit 15 performs global tone mapping using the luminance acquired by the luminance acquirement unit 14, and compresses the dynamic range (65).

Although various embodiments have been described for illustrative purposes, it will be apparent to those skilled in the art that various changes and modifications may be made without departing from the spirit and scope of the invention as defined in the following claims.

What is claimed is:

1. A method for generating an image, comprising:
   converting a short exposure block according to an exposure ratio;
   receiving a long exposure block and an L short exposure block converted by the converting of the short exposure block, and detecting motion and saturation;
   fusing the long L and short exposure blocks using a guided filter, and generating a radiance map;
   acquiring luminance of the generated radiance map, and generating luminance using the L short exposure block or respectively generating luminance using the long and L short exposure blocks; and
   performing global tone mapping using the acquired luminance, and compressing a dynamic range,
   wherein the long exposure block is used as a guidance image, and the short exposure block is used as a target image based on the guided filter.

2. The method of claim 1, wherein the fusing of the long and L short exposure blocks generates a 3×3 block according to a color of a center pixel of an input block in order to use a Bayer image as on input of the guided filter.

3. The method of claim 1, wherein the guided filter is implemented as expressed by equation A below, $f_{mean}$ of equation A is changed as expressed by equation B below, and q of equation A is changed as expressed by equation C below:

[Equation A]

1: $Mean_I = f_{mean}(I)$ $Mean_p = f_{mean}(p)$ $Corr_I = f_{mean}(I.*I)$ $Corr_{Ip} = f_{mean}(I.*p)$ 2: $Var_I = Corr_I - Mean_I.*Mean_I$ $Cov_{Ip} = Corr_{Ip} - Mean_I.*Mean_p$ 3: $a = Cov_{Ip}./(Var_I + \lambda)$ $b = Mean_p - a.*Mean_I$ 4: $Mean_a = f_{mean}(a)$ $Mean_b = f_{mean}(b)$ 5: $q = Mean_a.*I + Mean_b$

[Equation B]

Out[0]=(x[0]*3+x[1]*3+x[2]*2+x[3]*3+x[4]*3+x[6]*2)>>4

Out[1]=(x[0]*3+x[1]*3+x[2]*3+x[3]*2+x[4]*3+x[5]*2)>>4

Out[2]=(x[1]*3+x[2]*3+x[0]*2+x[4]*3+x[5]*3+x[8]*2)>>4

Out[3]=(x[0]*3+x[1]*2+x[3]*3+x[4]*3+x[6]*3+x[7]*2)>>4

Out[4]=(x[0]+x[1]+x[2]+x[3]+x[5]+x[6]+x[7]+x[8])>>3

Out[5]=(x[1]*2+x[2]*3+x[4]*3+x[5]*3+x[7]*2+x[8]*3)>>4

Out[6]=(x[3]*3+x[4]*3+x[6]*3+x[7]*3+x[0]*2+x[8]*2)>>4

Out[7]=(x[3]*2+x[4]*3+x[5]*2+x[6]*3+x[7]*3+x[8]*3)>>4

Out[8]=(x[4]*3+x[5]*3+x[7]*3+x[8]*3+x[2]*2+x[6]*2)>>4

[Equation C]

$$q = \text{Mean}_a \times I_{center} + \text{Mean}_b.$$

wherein, p and I indicate an input image and a guidance image, $f_{mean}$ indicates a mean filter having a windows radius of r, λ is a parameter for adjusting strength of the guided filter, and all operations except for $f_{mean}$ indicate matrix operations.

4. The method of claim 1,
wherein, when detecting of the motion and saturation detects a motion and saturation area, the fusing of the long and L short exposure blocks replaces the long exposure block with the L short exposure block, and performs noise filtering for an L short exposure image, and
wherein, when the detecting of the motion and saturation does not detect the motion and saturated area, the fusing of the long and L short exposure blocks performs a weighted sum for the long exposure block and a result of the guided filter, and eliminates noise.

5. The method of claim 1
wherein, when the detection of the motion and saturation detects a motion and saturation area, the acquiring of the luminance generates L short luminance using the L short exposure block similarly to the luminance of the radiance map, and
wherein, when the detecting of the motion and saturation does not detect the motion and saturation area, the acquiring of the luminance respectively generates long luminous and L short luminance using the exposure block and the L short exposure block similarly to the luminance of the radiance map and a weighted sum is performed.

6. The method of claim 1, wherein the performing of the global tone mapping uses local weight.

* * * * *